US009117486B2

(12) United States Patent
Nakamura et al.

(10) Patent No.: US 9,117,486 B2
(45) Date of Patent: Aug. 25, 2015

(54) IMAGE OUTPUT APPARATUS, METHOD OF CONTROLLING IMAGE OUTPUT APPARATUS, AND PROGRAM

(75) Inventors: Sensaburo Nakamura, Kanagawa (JP); Takeo Ugai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 38 days.

(21) Appl. No.: 13/592,841

(22) Filed: Aug. 23, 2012

(65) Prior Publication Data

US 2013/0051775 A1    Feb. 28, 2013

(30) Foreign Application Priority Data

Aug. 31, 2011    (JP) .................. 2011-189041

(51) Int. Cl.
*H04N 5/783*     (2006.01)
*G11B 27/10*     (2006.01)
*G11B 27/30*     (2006.01)
*G11B 27/34*     (2006.01)

(52) U.S. Cl.
CPC .......... *G11B 27/105* (2013.01); *G11B 27/3036* (2013.01); *G11B 27/34* (2013.01)

(58) Field of Classification Search
CPC ... G11B 27/105; G11B 27/34; G11B 27/3036
USPC .......................................... 386/24, 241, 343
See application file for complete search history.

(56) References Cited

U.S. PATENT DOCUMENTS

| 6,018,337 | A  | * | 1/2000 | Peters et al. ................. 715/723 |
| 6,897,894 | B1 | * | 5/2005 | Miyazawa ................ 348/231.8 |
| 2005/0235211 | A1 | * | 10/2005 | Chen ............................. 715/723 |
| 2010/0269147 | A1 | * | 10/2010 | Zetterower et al. .......... 725/114 |
| 2011/0252367 | A1 | * | 10/2011 | Nakamura et al. ........... 715/810 |

FOREIGN PATENT DOCUMENTS

| JP | 2009-296305 | 12/2009 |
| JP | 2010-212901 | 9/2010 |

* cited by examiner

*Primary Examiner* — William Tran
(74) *Attorney, Agent, or Firm* — Frommer Lawrence & Haug LLP; William S. Frommer; Ellen Marcie Emas

(57) ABSTRACT

There is provided an image output apparatus including an image output unit capable of playing in a unit finer than a frame/field unit on a time axis, and a control unit that determines a play amount by performing a predetermined operation on an operation input amount, advances a time indicating a position on the time axis in accordance with the determined play amount, and instructs the image output unit to output an image at the advanced time.

17 Claims, 17 Drawing Sheets

IMAGE OUTPUT APPARATUS, METHOD OF CONTROLLING IMAGE OUTPUT APPARATUS, AND PROGRAM

BACKGROUND

The present technology relates to an image output apparatus, a method of controlling the image output apparatus, and a program. In particular, the present technology relates to an image output apparatus appropriate for uses such as operating CG (computer graphic) image output by a jog operation dial.

The frame rate of video of TV broadcasting is decided in favor of a predetermined value (for example, 30 frames/s) based on the broadcasting standard. Thus, many video materials used in programs have the same frame rate and a time code (TC) in frames as the minimum unit is attached to video materials as information indicating the temporal position (see, for example, Japanese Patent Application Laid-Open No. 2010-212901).

Devices used to edit such video materials also use the time code to specify the temporal position or an interval. The time code is denoted like HH:MM:SS:FF indicating HH hours, MM minutes, SS seconds, FF frames. If the frame rate is, for example, 30 frames/s, FF takes an integer between 0 and 29. However, if the video material is interlaced, FF practically takes the value in increments of 0.5 to distinguish between odd (ODD) fields and even (EVEN) fields.

This also applies when the video material is CG animation in related art and the time code HH:MM:SS:FF is attached to each frame of dynamic images by CG produced and rendered at a frame rate of 30 frames/s in advance.

A search operation by a jog shuttle is performed, for example, to decide an editing point of a video material, verify/check content thereof, or decide a point suitable for alignment. The alignment in which content of animation materials moving through images is stopped in a position aligned with an image (example: face of a speaker) of live-action images to be superimposed on is performed to be used for broadcasting or the like.

For example, Japanese Patent Application Laid-Open No. 2009-296305 describes both modes of the jog shuttle. If CG animation in which the number of frames described above is determined is used as a video material, it is enough to advance frames by a jog operation in the minimum unit even when animation is minutely moved on a time line. That is, the jog operation in related art advances the time code one by one (by 0.5 for an interlaced material).

SUMMARY

In recent years, technology to generate CG images from CG description data including a time line operation by real-time rendering is about to be used widely. Even such CG animation has a fixed length during production and outputs, like a video material in related art, frame images sequentially for a normal play.

Such CG animation can also be played, for example, in a time length 10 times the length during production. In such a case, as a play at a 1/10 speed, a real slow play in which each frame to be output is slowly played is enabled. However, according to jog control technology in related art, it is difficult to play one frame at a time in accordance with the time code attached to the material.

Thus, it is desirable to make it possible to minutely align output images.

A concept of the present technology is
an image output apparatus, including
an image output unit capable of playing in a unit finer than a frame/field unit on a time axis, and
a control unit that determines a play amount by performing a predetermined operation on an operation input amount, advances a time indicating a position on the time axis in accordance with the determined play amount, and instructs the image output unit to output an image at the advanced time.

According to the present technology, the image output unit can play in a unit finer than the frame/field unit on the time axis. For example, the image output unit generates computer graphics images based on computer graphics description data containing a time line operation.

The control unit that determines a play amount by performing a predetermined operation on an operation input amount, advances a time indicating a position on the time axis in accordance with the determined play amount, and instructs the image output unit to output an image at the advanced time. For example, the control unit determines the play amount by performing the predetermined operation on the operation input amount, determines a time line time indicating the time on the time line in accordance with the determined play amount, and instructs the image output unit to generate a computer graphics image at the advanced time line time.

The operation input amount is defined as, for example, the number of instruction steps by a jog operation dial. Then, the control unit determines the play amount by multiplying the number of instruction steps by a step amount, which is the number of frames/fields as a real value for one instruction step to determine the play amount. For example, a step amount setting unit to set the step amount is further included. The jog operation dial is an operation unit in which one step as the minimum unit to measure the rotation corresponds to the play of one frame or one field and thus, the play amount can be set to values other than a multiple of one frame or one field by multiplication. As a result, the play amount can also take a fractional value.

Thus, according to the present technology, the time indicating the position on the time axis is advanced in accordance with the play amount determined by performing a predetermined operation on the operation input amount and the image output unit is controlled to output the image of the advanced time. If, for example, an operation to make the play amount smaller is performed on the operation input amount, the time indicating the position on the time axis advances more slowly for operation input. Thus, output images can be aligned more minutely.

In the present technology, a step amount decision unit that decides the step amount based on the time line may further be included. Also in the present technology, a step amount decision unit that decides the step amount for each time line time based on corresponding relation information between the time line time and the step amount may further be included. Also in the present technology, a step amount decision unit that decides the step amount based on, for example, an angular velocity of the jog operation dial may further be included. In this case, an appropriate step amount can automatically be decided even if the user does not input any step amount so that an appropriate jog operation can be performed on animation.

The step amount decision unit decides the step amount based on, for example, a ratio of the length of a time line to the reference length. Also, the step amount decision unit decides the step amount based on, for example, the length between adjacent key frames of the time line. In this case, the step amount decision unit decides the step amount for the whole time line based on, among lengths between key frames of a plurality of pairs of key frames contained in the time line, the shortest length between key frames. Also in this case, the step amount decision unit decides the step amount based on, for example, the length between key frames of each pair of key frames.

Also according to the present technology, for example, a computer graphics description data holding unit that holds a plurality of pieces of the computer graphics description data and a step amount storage unit that stores the step amount corresponding to each of the plurality of pieces of computer graphics description data may further be included, wherein the image output unit generates the computer graphics image by using one piece of the computer graphics description data selected from the plurality of pieces of computer graphics description data and the control unit determines the play amount by using the step amount corresponding to the computer graphics description data used by the image output unit. In this case, an appropriate step amount suited to the computer graphics description data used by the image output unit can be used and an appropriate jog operation can be performed on animation.

Also according to the present technology, for example, a velocity coefficient may be attached to the computer graphics description data and the control unit may determine the play amount by multiplying the number of instruction steps by the step amount and further by the velocity coefficient. In this case, an appropriate jog operation can be performed on animation to which the velocity coefficient is attached.

Another concept of the present technology is an image output apparatus, including a first image output unit capable of playing in a unit finer than a frame/field unit on a time axis, a second image output unit that plays in units of frames/fields on the time axis, and a control unit that determines a play amount by performing a predetermined operation on an operation input amount, advances a time indicating a position on the time axis in accordance with the determined play amount, instructs the first image output unit to output an image at the advanced time, and instructs the second image output unit to output an image at a value obtained by rounding off the advanced time to a frame/field unit.

According to the present technology, the first image output unit can play in a unit finer than the frame/field unit on the time axis. For example, the first image output unit generates computer graphics images based on computer graphics description data containing a time line operation. The second image output unit plays in units of frames/fields. For example, the second image output unit is an image reproduction unit such as a VTR.

The control unit determines a play amount by performing a predetermined operation on an operation input amount and advances a time indicating a position on the time axis in accordance with the determined play amount. Then, the control unit instructs the first image output unit to output an image at the advanced time and instructs the second image output unit to output an image at a value obtained by rounding off the advanced time to a frame/field unit.

Thus, according to the present technology, the time indicating a position on the time axis is advanced in accordance with the play amount determined by a predetermined operation being performed on the operation input amount and the first image output unit is controlled to output an image at the advanced time. If, for example, an operation is performed on the operation input amount in such a way that the play amount becomes smaller, the time indicating the position on the time axis advances more slowly. Thus, output images can be aligned more minutely. The second image output unit is controlled to output an image at a value obtained by rounding off the advanced time to the frame/field unit. Thus, the second image output unit can also be controlled excellently.

According to the present technology, if, for example, a play command is received after the first image output unit being stopped playing based on the operation input amount, the control unit may make adjustments to remove a unit portion finer than the frame/field unit from a held time on the time axis and then instruct the first image output unit to output an image at the adjusted time. Accordingly, images from the first image output unit and images from the second image output unit can avoid being kept shifted due to a unit portion finer than the frame/field unit.

According to the present technology, output images can minutely be aligned.

DETAILED DESCRIPTION OF THE EMBODIMENTS

Forms (hereinafter, referred to as "embodiments") to carry out the present technology will be described below. The description will be provided in the order below:

1. First embodiment
2. Second embodiment
3. Modification

<1. First Embodiment>

Figure 1:
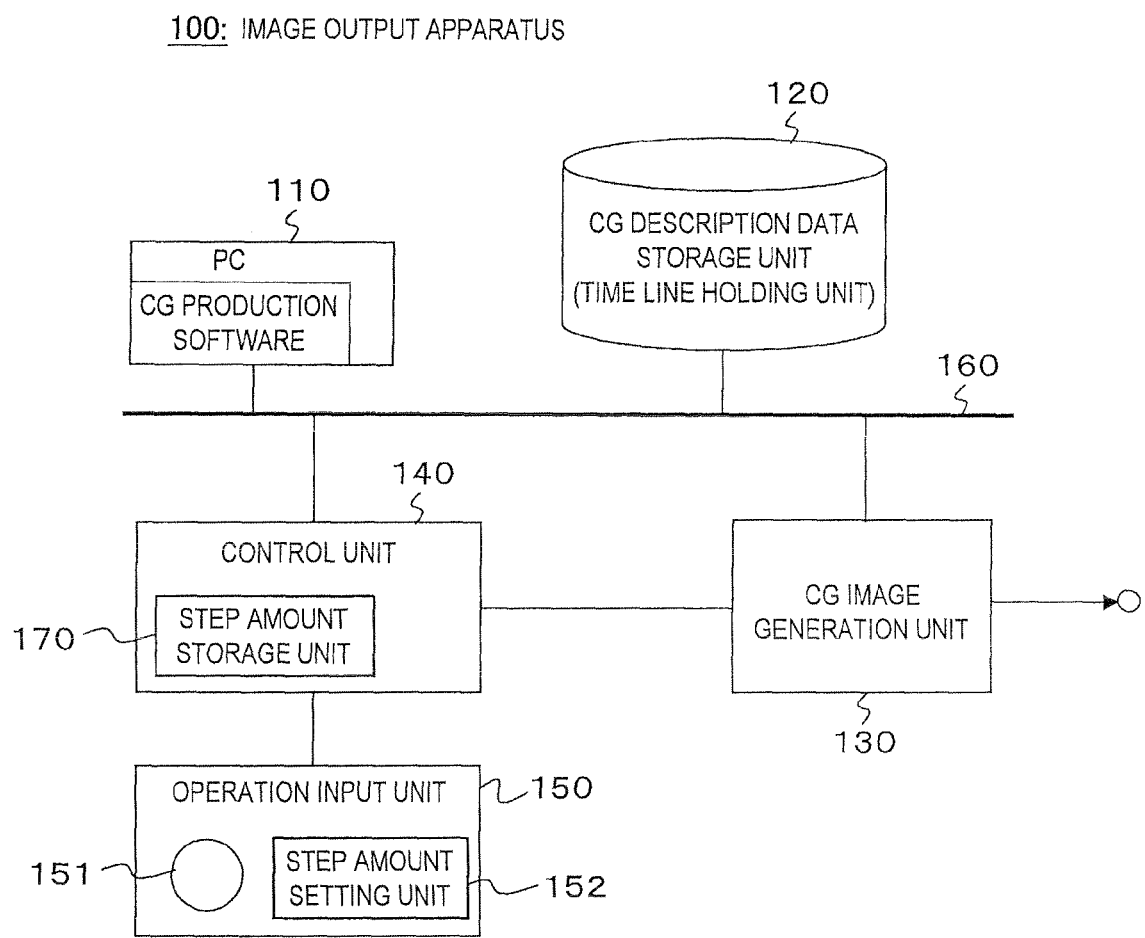
FIG. 1 is a block diagram showing a configuration example of an image output apparatus as a first embodiment of the present technology.

FIG. 1 shows a configuration example of an image output apparatus 100 as a first embodiment of the present technology. The image output apparatus 100 includes a CG (computer graphic) production unit 110, a CG description data storage unit 120, a CG image generation unit 130, a control unit 140, an operation input unit 150, and a network 160. The CG production unit 110, the CG description data storage unit 120, the CG image generation unit 130, and the control unit 140 are mutually connected by the network 160.

The CG production unit 110 is constituted of a personal computer (PC) having CG production software. The CG production unit 110 outputs CG description data in a predetermined format. For example, Collada (registered trademark) is known as a format of CG description data. Collada is a description definition to realize the exchange of 3D CG data on XML (Extensible Markup Language). Information shown below, for example, is described in CG description data:

(a) Material (surface mode) definition The material definition is quality of the surface (how the surface looks) of a CG object. The material definition includes information about the color, reflection mode, light emission, and irregularities. The material definition may also include texture mapping information. Texture mapping is a method of pasting an image to a CG object and can represent a complex pattern while relatively reducing the load of a processing system.

(b) Geometry information Geometry definition

The geometry information Geometry definition includes information such as position coordinates and vertex coordinates of a polygon mesh.

(c) Camera definition

The camera definition includes camera parameters.

(d) Animation definition

The animation definition includes various kinds of information in each key frame of the animation. The animation definition also includes time information in each key frame of the animation. Various kinds of information include, for example, information such as the time and position of a key frame, coordinate values of a vertex, size, tangent vectors, and interpolation method of a corresponding object (node) and changes during animation of various kinds of information.

(e) Position, direction, and magnitude of a node (object) in a scene, corresponding geometry information definitions, and corresponding material definitions The above information is not separate and is associated, for example, as shown below:

Node—geometry information

Node—material (more than one material)

Geometry information—polygon set (more than one set)

Polygon set—material (one of materials corresponding to a node)

Animation—node

A description constituting one screen is called a scene. Each definition is called a library and referred to from a scene. If, for example, two rectangular parallelepiped objects are present, each object is described as a node and each node is associated with one of material definitions. As a result, each rectangular parallelepiped object is associated with a material definition and rendered with the color and reflection properties in accordance with each material definition.

Alternatively, if a rectangular parallelepiped object is described by a plurality of polygon sets and each polygon set is associated with a material definition, the rectangular parallelepiped object is rendered by using a different material definition for each polygon set. For example, while a rectangular parallelepiped has six surfaces, a rectangular parallelepiped object may be described by three polygon sets, like three surfaces of these surfaces by one polygon set, one surface by one polygon set, and two surfaces by one polygon set. Because each polygon set can be associated with a different material definition, each surface may be rendered in a different color.

If texture mapping is specified in the material definition, an image based on image data is texture-mapped to the surface of an associated object.

For example, the material definition is set to texture-map an image. Thus, the same image may be texture-mapped to all surfaces of a rectangular parallelepiped object or a different image may be texture-mapped to each surface.

The CG description data storage unit 120 stores a predetermined number of pieces of CG description data generated by the CG production unit 110. The CG description data contains a time line (description of temporally changing control) of original animation. In this sense, the CG description data storage unit 120 constitutes a time line holding unit. The CG image generation unit 130 generates a CG image as a three-dimensional virtual space image based on CG description data stored in the CG description data storage unit 120.

The control unit 140 controls the operation of each unit of the image output apparatus 100. The control unit 140 exercises play control of CG image generation by the CG image generation unit 130 in accordance with operation input by the user from the operation input unit 150. The play control also includes a jog play based on the operation of a jog operation dial 151 by the user.

The control unit 140 includes a step amount storage unit 170 that stores step amounts to control the jog play. The step amount means the number of frames/fields as a real value for one instruction step of the jog operation dial 151. The step amount storage unit 170 is enabled to store the step amount for each piece of CG description data stored in the CG description data storage unit 120.

The operation input unit 150 constitutes a user interface. The operation input unit 150 is connected to the control unit 140. The user can perform various operations by operating the operation input unit 150. For example, the user can perform an operation to select CG description data to be used by the CG image generation unit 130 from a predetermined number of pieces of CG description data stored in the CG description data storage unit 120. When this operation is performed, the control unit 140 loads the selected CG description data into the CG image generation unit 130 from the CG description data storage unit 120.

For example, the user can perform an operation to turn on/off the play of CG image generation. When an operation to turn on the play of CG generation is performed, a play command is sent from the operation input unit 150 to the control unit 140. At this point, the control unit 140 sequentially advances the time line time indicating the position on the time line from the held time line time (initially, from the start of animation) and controls the CG image generation unit 130 so that a CG image corresponding to the time line time is generated. If the time line time is not a key frame, the control unit 140 interpolates parameters of the time line time by using parameters of the previous and subsequent key frames on the time line to decide the control for the CG image generation unit 130.

When an operation to turn off the play of CG image generation is performed, a play stop command is sent from the operation input unit 150 to the control unit 140. At this point, the control unit 140 stops the advance of the time line time indicating the position on the time line and controls the CG image generation unit 130 to a state in which, for example, the CG image at the time line time whose advance is stopped is generated. If an operation to turn on the play of CG image generation is performed again in this state, the control unit 140 sequentially advances the time line time indicating the position on the time line from the held time line time and controls the CG image generation unit 130 so that a CG image corresponding to the time line time is generated.

The operation input unit 150 includes a step amount setting unit 152. The user can set the step amount for each piece of CG description data stored in the CG description data storage unit 120 by the step amount setting unit 152. That is, the user can decide and set the step amount for each piece of CG description data in accordance with content of the CG animation. The step amount by the setting is stored in the step amount storage unit 170 of the control unit 140. The user is also enabled to change or delete the step amount of each piece of CG description data stored in the step amount storage unit 170 of the control unit 140 by the step amount setting unit 152.

The operation input unit 150 includes the jog operation dial 151. The user can perform a jog operation for CG image generation by the CG image generation unit 130 by operating the jog operation dial 151. The number of instruction steps as an operation input amount and rotation direction information are sent to the control unit 140 in accordance with the rotation operation of the jog operation dial 151.

The control unit 140 advances or regresses (reverse-advance) the time line time indicating the position on the time line from the held time line time in accordance with the number of instruction steps to control CG image generation unit 130 so that a CG image in accordance with the time line time is generated. For example, the time line time is advanced when the rotation direction of the jog operation dial 151 is clockwise and the time line time is regressed when the rotation direction of the jog operation dial 151 is counterclockwise. If the time line time is not a key frame, the control unit 140 interpolates parameters of the time line time by using parameters of the previous and subsequent key frames on the time line to decide the control for the CO image generation unit 130.

The control unit 140 determines the play amount of the time line time by multiplying the number of instruction steps from the jog operation dial 151 by the step amount stored in the step amount storage unit 170. The step amount corresponds to the CG description data currently used by being loaded into the CG image generation unit 130. If, for example, the number of instruction steps is N and the step amount is M frames, the control unit 140 determines N×M frames as the play amount. The step amount is, as described above, a real value. Thus, the play amount as described above is also a real value.

If the material is interlaced, the step amount is given in units of fields. In such a case, the control unit 140 performs an operation by converting one field into 0.5 fields. If, for example, the number of instruction steps is N and the step amount is M fields, the control unit 140 determines N×M×0.5 as the play amount.

Figure 2:
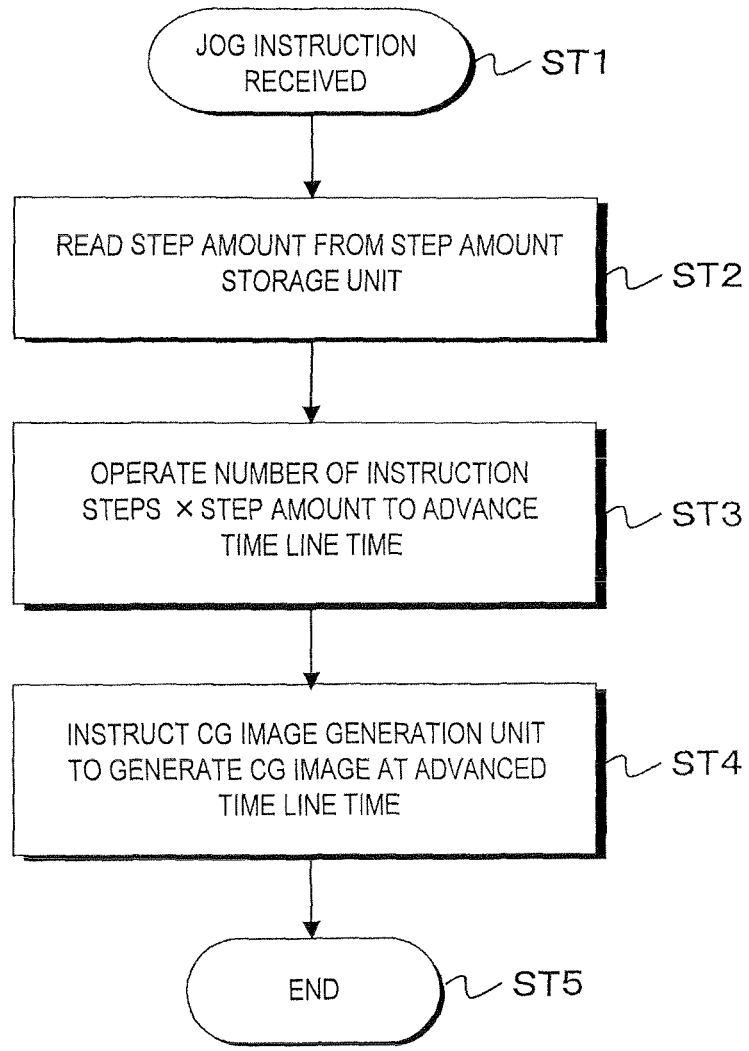
FIG. 2 is a flow chart showing an example of a control operation of a control unit when a jog instruction is received.

The flow chart in FIG. 2 shows an example of the control operation when the user operates the jog operation dial 151 and the control unit 140 receives a jog instruction, that is, the number of instruction steps and rotation direction information. In step ST1, the control unit 140 receives a jog instruction to start the control operation. When the rotation of the jog operation dial 151 is detected, the instruction step amount is determined in proportion to the rotation amount during one frame time or one field time and thus, a jog instruction is generated by being accompanied by the instruction step amount thereof. A jog instruction is generated once or is not generated in each time of one frame or one field.

Next, in step ST2, the control unit 140 reads the step amount corresponding to the CG description data currently used by being loaded from the step amount storage unit 170 into the CG image generation unit 130. Then, in step ST3, the control unit 140 determines the play amount by multiplying the number of instruction steps by the step amount and adds the play amount to the held time line time to advance the time line time. In this case, the sign of the play amount is positive if the rotation direction is clockwise and the sign of the play amount is negative if the rotation direction is counterclockwise.

Next, in step ST4, the control unit 140 instructs the CG image generation unit 130 to generate a CG image at the advanced time line time. In this case, if the time line time is not a key frame, the control unit 140 interpolates parameters of the time line time by using parameters of the previous and subsequent key frames on the time line to decide the control for the CG image generation unit 130. After the processing in step ST4, the control unit 140 terminates the control operation in step ST5.

In the image output apparatus 100 shown in FIG. 1, as described above, when there is a jog instruction by the jog operation dial 151, the control unit 140 determines the play amount by multiplying the number of instruction steps by the step amount to advance the time line time. Then, the control unit 140 instructs the CG image generation unit 130 to generate a CG image at the advanced time line time. In this case, if, for example, the step amount is set small, the play amount for one instruction step of the jog operation dial 151 becomes smaller. Thus, it becomes possible for the CG image generation unit 130 to align output images more minutely.

Figure 3:
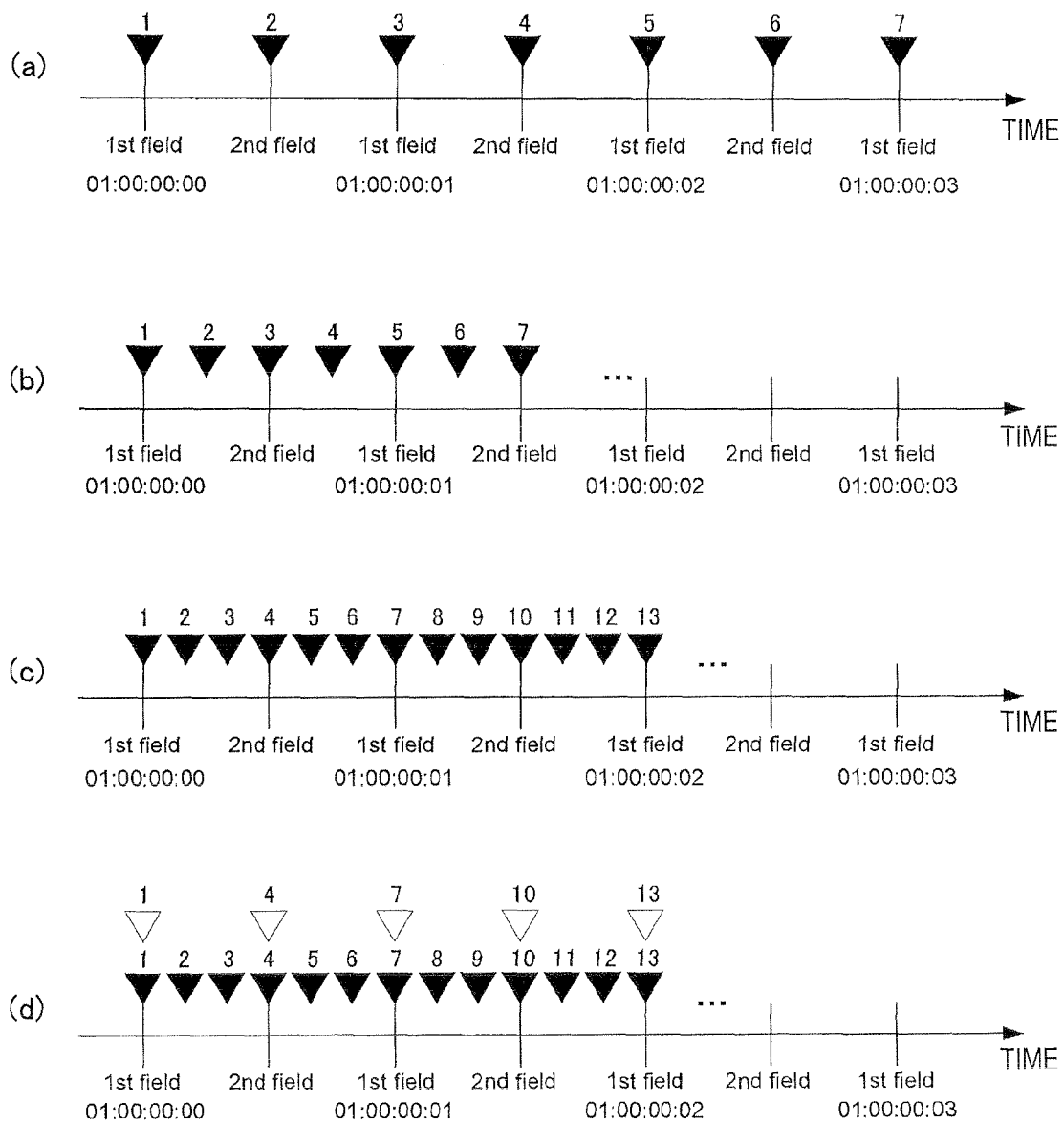
FIG. 3 is a diagram showing a corresponding relation between frames/fields and time line times and an example of instruction timing from the control unit to a CG image generation unit and an image reproduction unit.

FIG. 3 is a diagram showing a corresponding relation between frames/fields and time line times and an example of instruction timing from the control unit 140 to the CG image generation unit 130 and the like. In a jog operation in related art, as indicated by "black inverted delta" symbols in FIG. 3A, frames are advanced/returned in units of frames/fields.

In contrast, FIG. 3B shows an example in which the step amount is set to 0.5 fields. In this case, as indicated by "black inverted delta" symbols, the time line time is advanced in increments of ¼ frame (½ field) with respect to one instruction step of the jog operation dial 151 and the CG image generation unit 130 is instructed to generate an image at the advanced time line time. While no jog operation is performed, the CG image generation unit 130 continues to output the CG image corresponding to the time line time advanced lastly by the previous jog operation. This also applies when the step amount takes other values.

FIG. 3C shows an example in which the step amount is set to ⅓ field. In this case, as indicated by "black inverted delta" symbols, the time line time is advanced in increments of ⅙ frame (⅓ field) with respect to one instruction step of the jog operation dial 151 and the CG image generation unit 130 is instructed to generate an image at the advanced time line time.

[Using the Step Amount Added to CG Description Data]

In the above embodiment, an example in which the step amount set by the step amount setting unit 152 being operated by the user is used is shown. However, the step amount is added to CG description data stored in the CG description data storage unit 120 and using the step amount can also be considered. In such a case, when CG description data is loaded from the CG description data storage unit 120 into the CG image generation unit 130, the control unit 140 stores the step amount attached to the CG description data in the step amount storage unit 170 and reads and uses the step amount when a jog operation is received.

Figure 4:
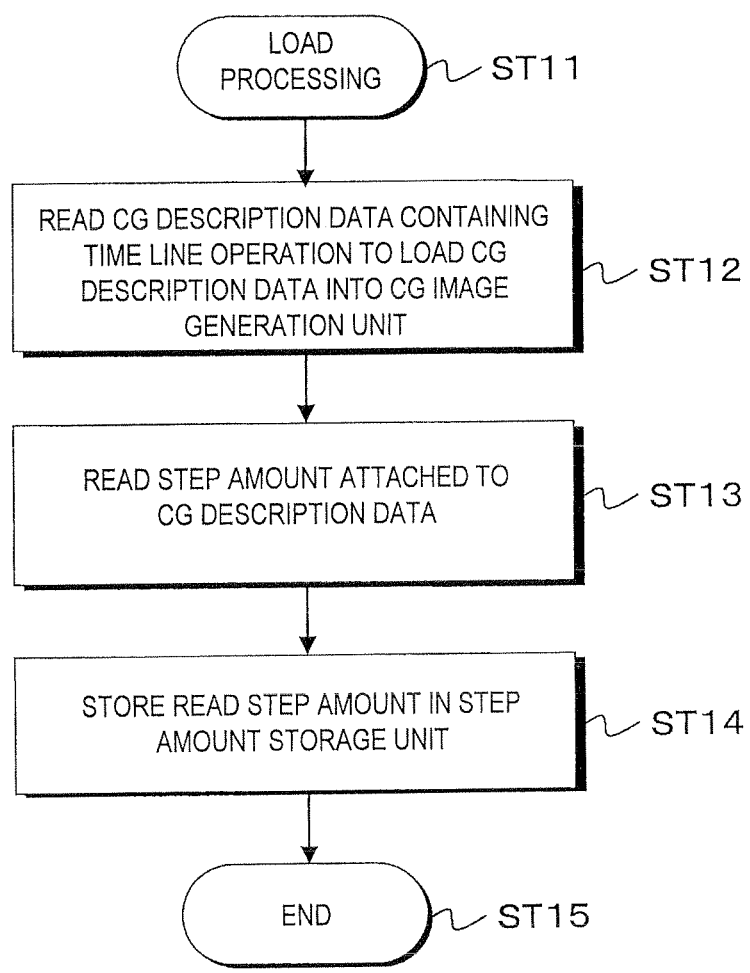
FIG. 4 is a flow chart showing an example of load processing by the control unit when a step amount attached to CG description data is used.

The flow chart in FIG. 4 shows an example of load processing by the control unit 140 when the step amount attached to CG description data is used. In step ST11, the control unit 140 starts load processing. The load processing is started by, for example, an operation to select the CG description data to be used by the CG image generation unit 130 being performed by the user through the operation input unit 150.

Next, in step ST12, the control unit 140 reads the user-selected CG description data containing a time line operation (animation) from the CG description data storage unit 120 to load the CG description data into the CG image generation unit 130. Then, in step ST13, the control unit 140 reads the step amount attached to the CH description data from the CG description data storage unit 120 or elsewhere.

Next, in step ST14, the control unit 140 stores the read step amount in the step amount storage unit 170. After the processing in step ST14, the control unit 140 terminates the load processing in step ST15.

Thus, if the step amount attached to the CG description data is used, the user can save the time and effort to set the step amount and also can perform an appropriate jog operation with the step amount per instruction step suited to CG description data.

[Decision of the Step Amount Based on the Time Line of CG Description Data]

In the above embodiment, an example in which the step amount set by the step amount setting unit 152 being operated by the user is used is shown. However, deciding the step amount based on the time line of CG description data loaded from the CG description data storage unit 120 into the CG image generation unit 130 and using the step amount can also be considered.

For example, the control unit 140 decides the step amount based on the ratio of the length of the time line of CG description data loaded into the CG image generation unit 130 to the reference length. The step amount is decided so as to reduce the play amount (jog amount) for one instruction step of the jog operation dial 151 by assuming that changes over time increase with a decreasing length of animation. For example, if the length of the time line (length of the animation) is L (s), the control unit 140 determines the step amount J by Formula (1) shown below. However, the function of L to determine the step amount J is not limited to Formula (1).

$$J = L/15 \quad (1)$$

In this case, if the animation lasts 15 s, one (frame or field) is decided as the step amount. If the animation lasts 30 s, two is decided as the step amount, increasing the play amount (jog amount) for one instruction step of the jog operation dial 151. Further, if the animation lasts 5 s, ⅓ is decided as the step amount, decreasing the play amount (jog amount) for one instruction step of the jog operation dial 151.

Figure 5:
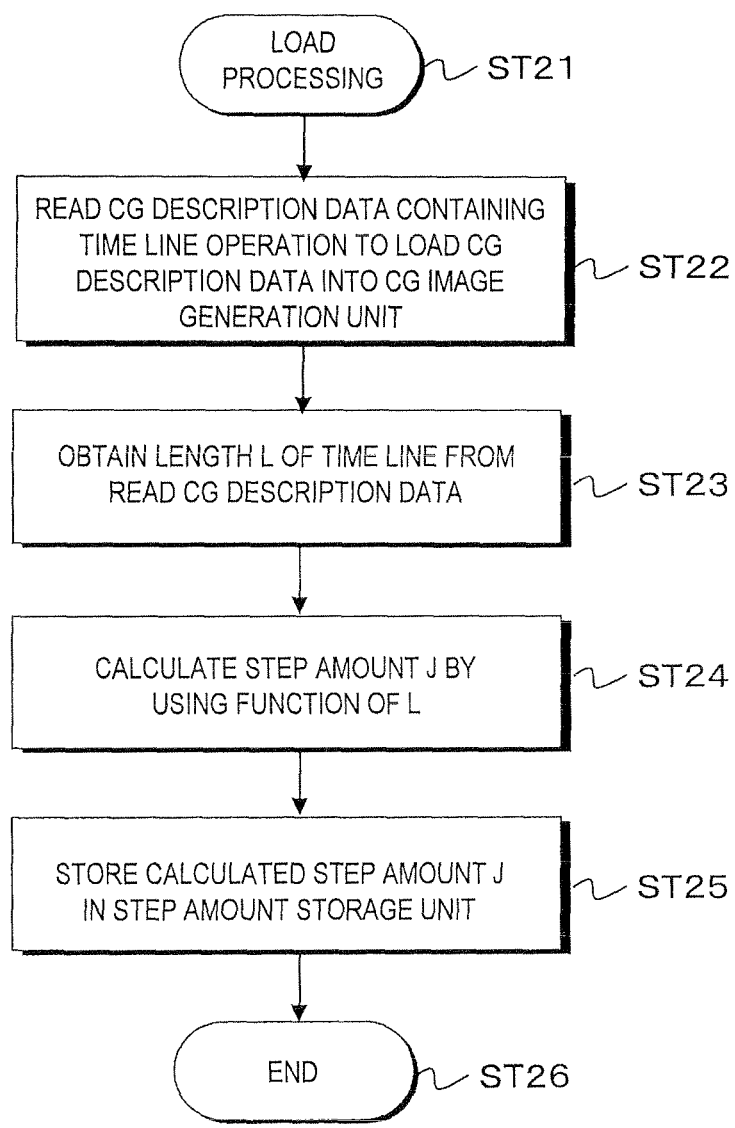
FIG. 5 is a flow chart showing an example of the load processing by the control unit when the step amount is decided based on a ratio of a length of a time line of CG description data to a reference length and used.

The flow chart in FIG. 5 shows an example of the load processing by the control unit 140 in that case. In step ST21, the control unit 140 starts the load processing. The load processing is started by, for example, an operation to select the CG description data to be used by the CG image generation unit 130 being performed by the user through the operation input unit 150.

Next, in step ST22, the control unit 140 reads the user-selected CG description data containing a time line operation (animation) from the CG description data storage unit 120 to load the CG description data into the CG image generation unit 130. Then, in step ST23, the control unit 140 obtains the length L of the time line from the read CG description data.

Next, in step ST24, the control unit 140 calculates the step amount J using a function of L (see, for example, Formula (1)). Then, in step ST25, the control unit 140 stores the calculated step amount J in the step amount storage unit 170. After the processing in step ST25, the control unit 140 terminates the load processing in step ST26.

Thus, if the step amount is decided based on the length of the time line, the user can save the time and effort to set the step amount and also can perform an appropriate jog operation with the step amount per instruction step suited to CG description data.

For example, the control unit 140 is made to decide the step amount based on the length between adjacent key frames (key frame interval) on the time line of the CG description data loaded into the CG image generation unit 130. If the key frame interval is narrow (the time is short), the change is rapid and thus, a minute operation can be performed more easily if the play amount (jog amount) for one instruction step of the jog operation dial 151 is reduced.

Figure 6:
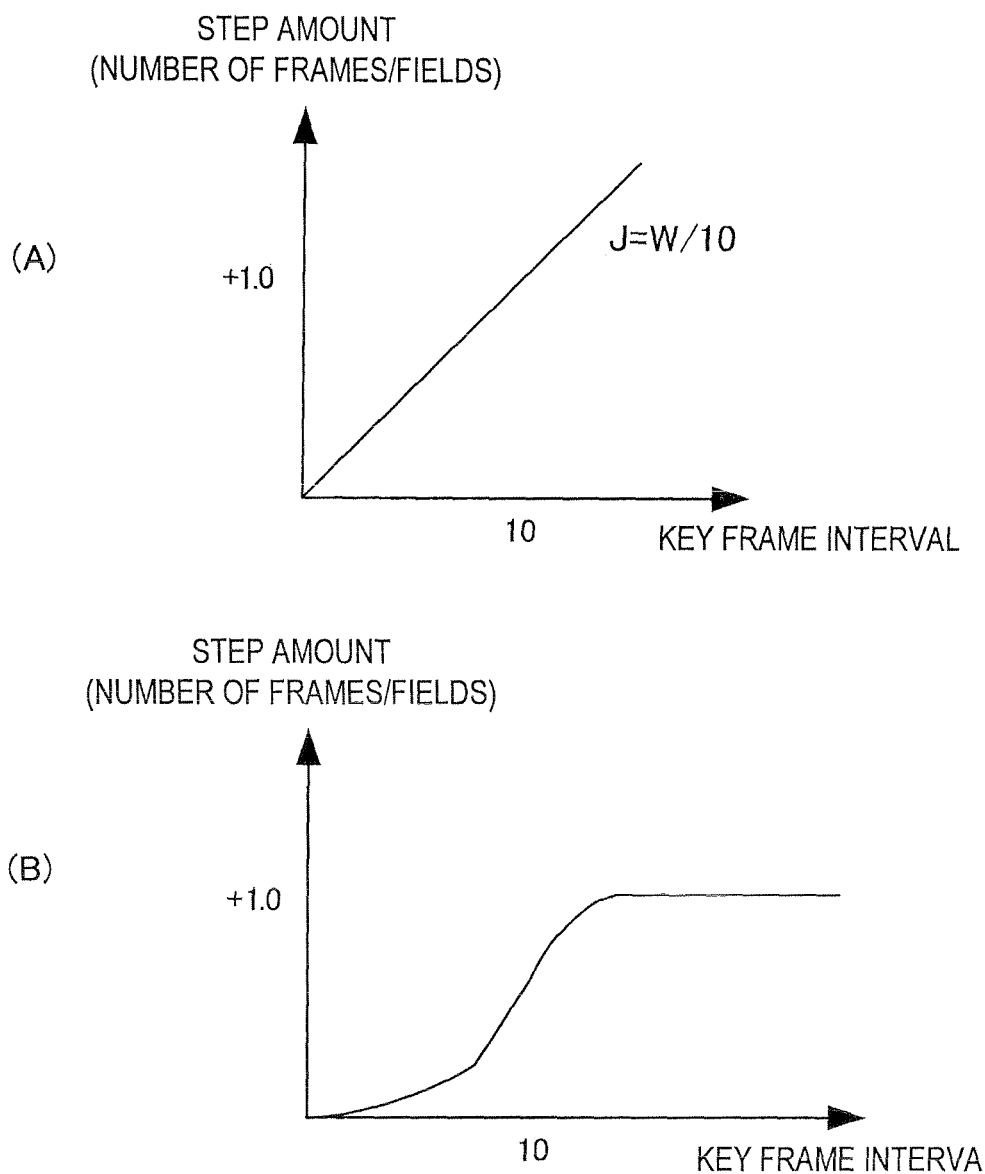
FIG. 6 is a diagram illustrating functions used to decide the step amount from a key frame interval.

For example, if the interval of key frames (length including both adjacent key frames) is W (s), the control unit 140 determines the step amount J by Formula (2) shown below. FIG. 6A shows the function of W of Formula (2).

$$J = W/10 \quad (2)$$

In this case, if the key frame interval is 10 s, one (frame or field) is decided as the step amount. If the key frame interval is 5 s, ½ is decided as the step amount, reducing the play amount (jog amount) for one instruction step of the jog operation dial 151.

Thus, if the step amount is decided by using the key frame interval, the control unit 140 can decide, for example, one step amount for the whole time line of CG description data. In this case, for example, the shortest key frame interval on the time line (animation) is used as the key frame interval used to decide the step amount J. In this case, a necessary minute jog operation can be performed by the jog operation dial 151.

Figure 7:
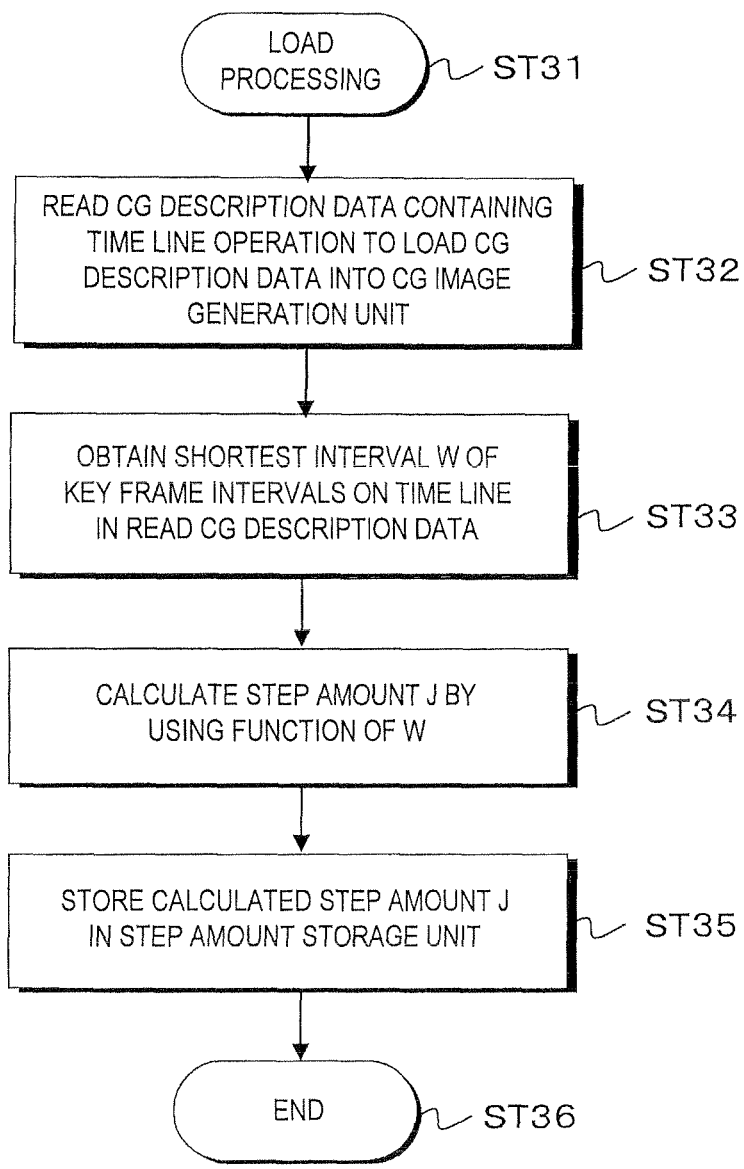
FIG. 7 is a flow chart showing an example of the load processing by the control unit when one step amount is decided for the whole time line of CG description data.

The flow chart in FIG. 7 shows an example of the load processing by the control unit 140 in that case. In step ST31, the control unit 140 starts the load processing. The load processing is started by, for example, an operation to select the CG description data to be used by the CG image generation unit 130 being performed by the user through the operation input unit 150.

Next, in step ST32, the control unit 140 reads the user-selected CG description data containing a time line operation (animation) from the CG description data storage unit 120 to load the CG description data into the CG image generation unit 130. Then, in step ST33, the control unit 140 obtains the shortest key frame W of key frame intervals on the time line of the read CG description data.

Next, in step ST34, the control unit 140 calculates the step amount J using a function of W (see, for example, Formula (2)). Then, in step ST35, the control unit 140 stores the calculated step amount J in the step amount storage unit 170. After the processing in step ST35, the control unit 140 terminates the load processing in step ST36.

If the step amount is decided by using the key frame interval, the control unit 140 can decide the step amount based on the key frame interval, for example, for each key frame interval. In this case, a minute jog operation (operation aiming at the animation time) can be performed by the jog operation dial 151 on a time line where the key frame interval is narrow and a rough jog operation can be performed on a time line where the key frame interval is wide and the change is correspondingly slow.

Figure 8:
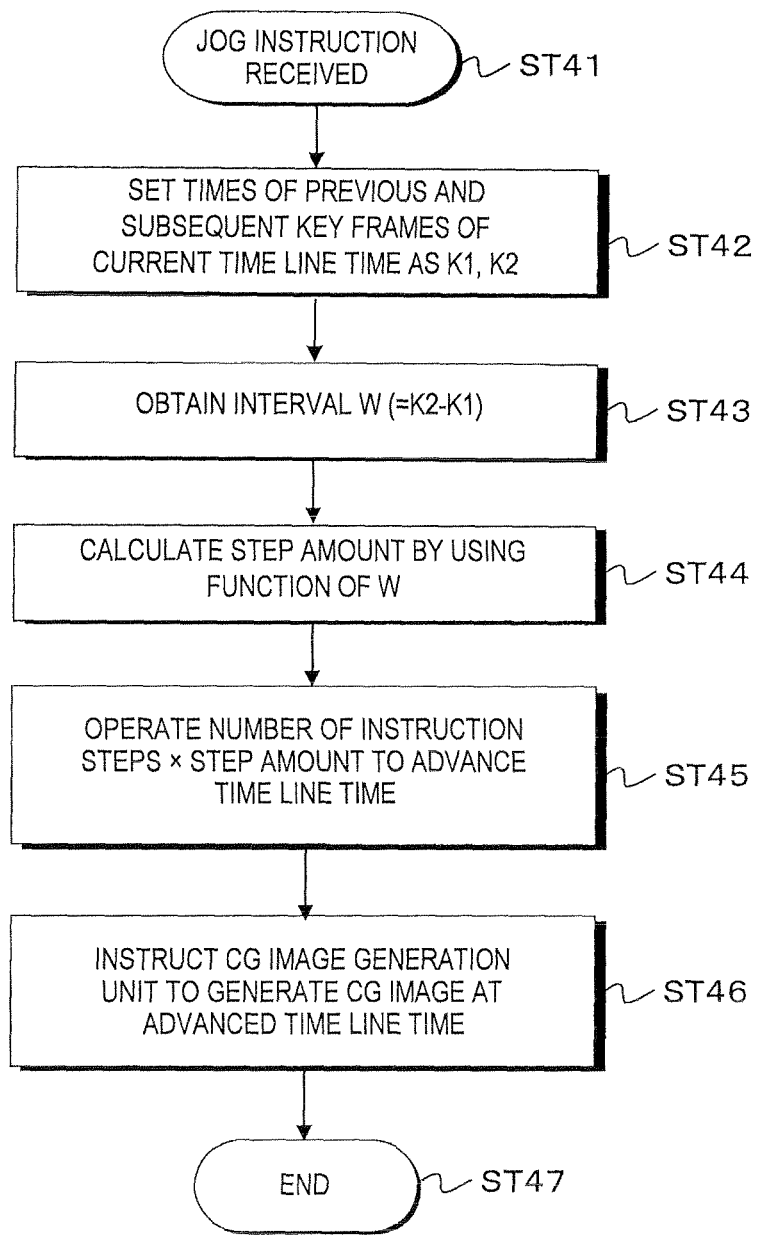
FIG. 8 is a flow chart showing an example of the control operation of the control unit during reception of a jog instruction when the step amount is decided based on a key frame interval for each pair of key frames.

The flow chart in FIG. 8 shows an example of the control operation of the control unit 140 when a jog instruction is received in that case. In step ST41, the control unit 140 receives a jog instruction to start the control operation.

Next, in step ST42, the control unit 140 sets times (time codes) of the previous and subsequent key frames of the current time line time as K1, K2. Then, in step ST43, the control unit 140 obtains the key frame interval W=K2−K1. In step ST44, the control unit 140 calculates the step amount J using a function of W (see, for example, Formula (2)).

Then, in step ST45, the control unit 140 determines the play amount by multiplying the number of instruction steps by the step amount and adds the play amount to the held time line time to advance the time line time. In this case, the sign of the play amount is positive if the rotation direction is clockwise and the sign of the play amount is negative if the rotation direction is counterclockwise.

Next, in step ST46, the control unit 140 instructs the CG image generation unit 130 to generate a CG image at the advanced time line time. In this case, if the time line time is not a key frame, the control unit 140 interpolates parameters of the time line time by using parameters of the previous and subsequent key frames on the time line to decide the control for the CG image generation unit 130. After the processing in step ST46, the control unit 140 terminates the control operation in step ST47.

The function of W to determine the step amount J is not limited to Formula (2) described above. For example, as shown in FIG. 6B, the adoption of a function in which the step amount decreases rapidly when the key frame interval becomes smaller than a certain value and the step amount remains constant when the key frame interval increases and exceeds a certain value can be considered. By using such a function, operability of minute locations and rough operations as being an operation feeling in related art unchanged can be made compatible.

Thus, if the step amount is decided based on the key frame interval of the time line, the user can save the time and effort to set the step amount and also can perform an appropriate jog operation with the step amount per instruction step suited to CG description data.

[Decision of the Step Amount Based on Corresponding Relation Information Between the Time Line Time and the Step Amount]

In the above embodiment, an example in which the step amount set by the step amount setting unit 152 being operated by the user is used is shown. However, a case when corresponding relation information between the time line time and the step amount corresponding to each of a predetermined number of pieces of CG description data stored in the CG description data storage unit 120 is stored can also be considered. In such a case, deciding the step amount based on the corresponding relation information and using the step amount can be considered.

Figure 9:
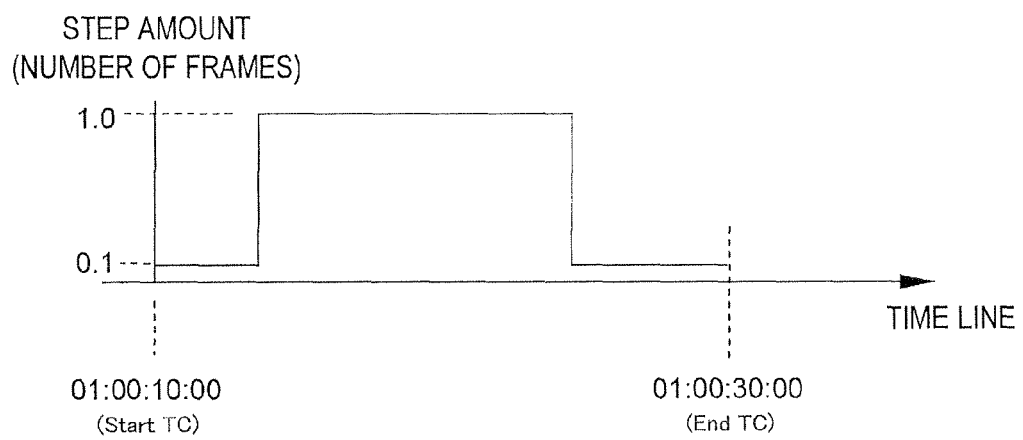
FIG. 9 is a diagram showing an example of corresponding relation information between the time line time and the step amount.
Figure 10:
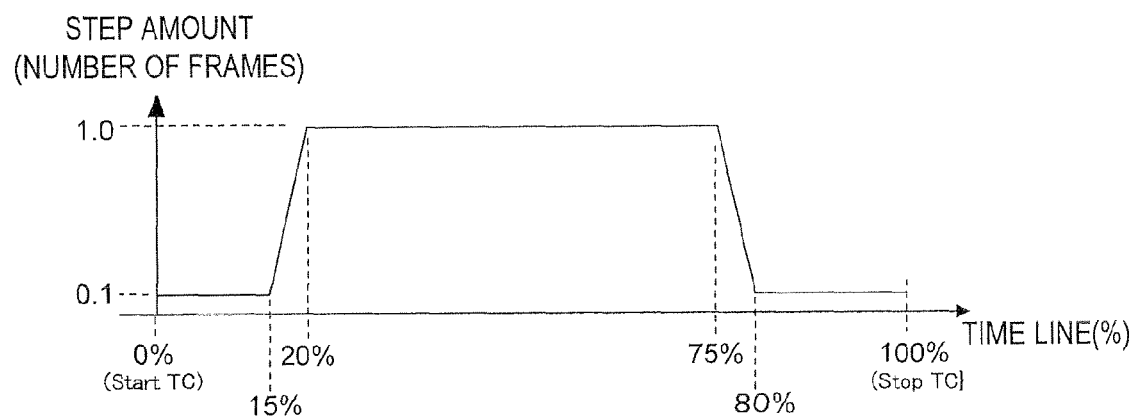
FIG. 10 is a diagram showing another example of the corresponding relation information between the time line time and the step amount.

FIG. 9 shows an example of corresponding relation information between the time line time and the step amount. In this example, the step amount is set small in the initial and end portions of the time line (animation) because minute jog operations should be performed. FIG. 10 shows another example of the corresponding relation information between the time line time and the step amount. This example is almost the same as the example shown in FIG. 9, but the horizontal axis is represented as the percentage (%) to the whole, instead of the value of time. Also in this example, the step amount is set small in the initial and end portions of the time line (animation) because minute jog operations should be performed. In this example, the step amount is made to change gradually, instead of changing rapidly, in boundary portions where the step amount changes significantly.

Figure 11:
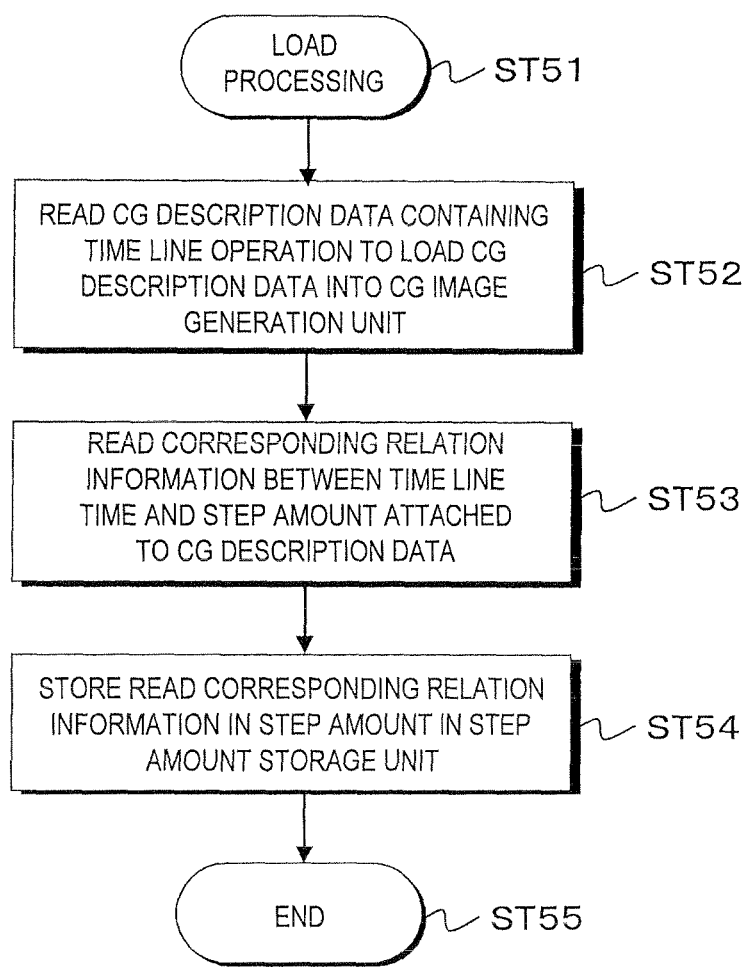
FIG. 11 is a flow chart showing an example of the load processing by the control unit when the step amount is decided based on the corresponding relation information between the time line time and the step amount and used.

The flow chart in FIG. 11 shows an example of the load processing by the control unit 140 in that case. In step ST51, the control unit 140 starts the load processing. The load processing is started by, for example, an operation to select the CG description data to be used by the CG image generation unit 130 being performed by the user through the operation input unit 150.

Next, in step ST52, the control unit 140 reads the user-selected CG description data containing a time line operation (animation) from the CG description data storage unit 120 to load the CG description data into the CG image generation unit 130. Then, in step ST53, the control unit 140 reads corresponding relation information (see FIGS. 9 and 10) between the time line time and the step amount attached to the CG description data from the CG description data storage unit 120 or elsewhere.

Next, in step ST54, the control unit 140 stores the read corresponding relation information between the time line time and the step amount in, for example, the step amount storage unit 170. After the processing in step ST54, the control unit 140 terminates the load processing in step ST55.

Figure 12:
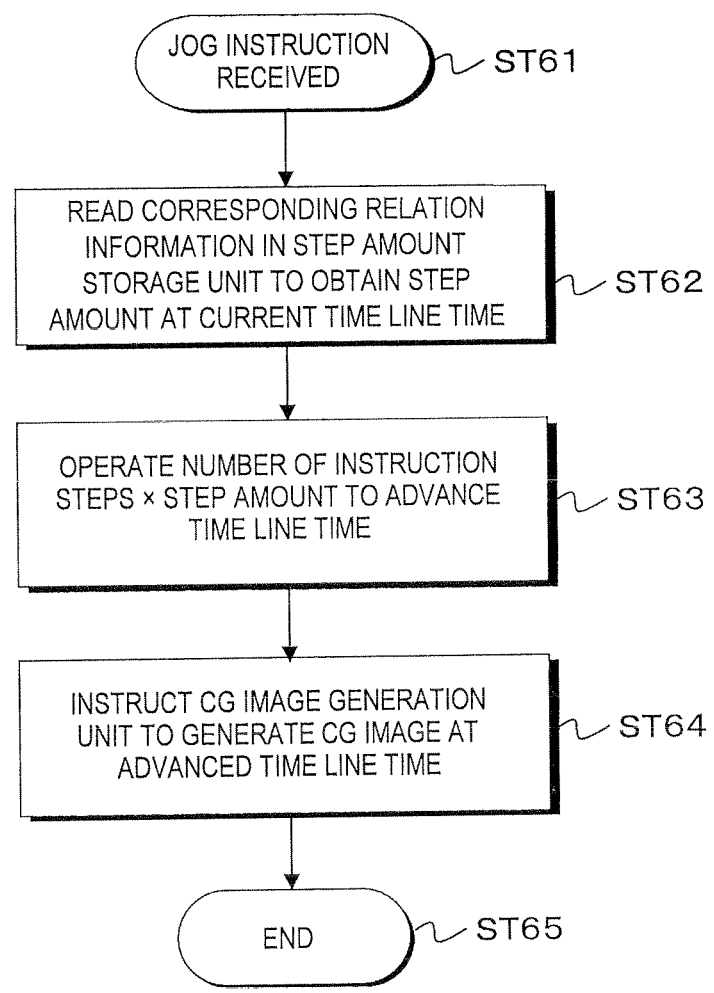
FIG. 12 is a flow chart showing an example of the control operation of the control unit during reception of a jog instruction when the step amount is decided based on the corresponding relation information between the time line time and the step amount and used.

The flow chart in FIG. 12 shows an example of the control operation of the control unit 140 in that case when a jog instruction is received. In step ST61, the control unit 140 receives a jog instruction to start the control operation.

Next, in step ST62, the control unit 140 reads corresponding relation information between the time line time and the step amount from the step amount storage unit 170 to obtain the step amount corresponding to the current time line time from the corresponding relation information. In this case, if the time line time in the corresponding relation information is represented as the percentage (%) to the whole, the control unit 140 calculates the percentage (%) of the current time line time to the whole and then obtains the step amount from the corresponding relation information.

Next, in step ST63, the control unit 140 determines the play amount by multiplying the number of instruction steps by the step amount and adds the play amount to the held time line time to advance the time line time. In this case, the sign of the play amount is positive if the rotation direction is clockwise and the sign of the play amount is negative if the rotation direction is counterclockwise.

Next, in step ST64, the control unit 140 instructs the CG image generation unit 130 to generate a CG image at the advanced time line time. In this case, if the time line time is not a key frame, the control unit 140 interpolates parameters of the time line time by using parameters of the previous and subsequent key frames on the time line to decide the control for the CG image generation unit 130. After the processing in step ST64, the control unit 140 terminates the control operation in step ST65.

Thus, if the step amount is decided based on the corresponding relation information between the time line time and the step amount stored in correspondence with CG description data, the user can save the time and effort to set the step amount and also can perform an appropriate jog operation with the step amount per instruction step suited to CG description data.

[Decision of the Step Amount Based on the Operation Speed (Angular Velocity) of the Jog Operation Dial]

Figure 13:
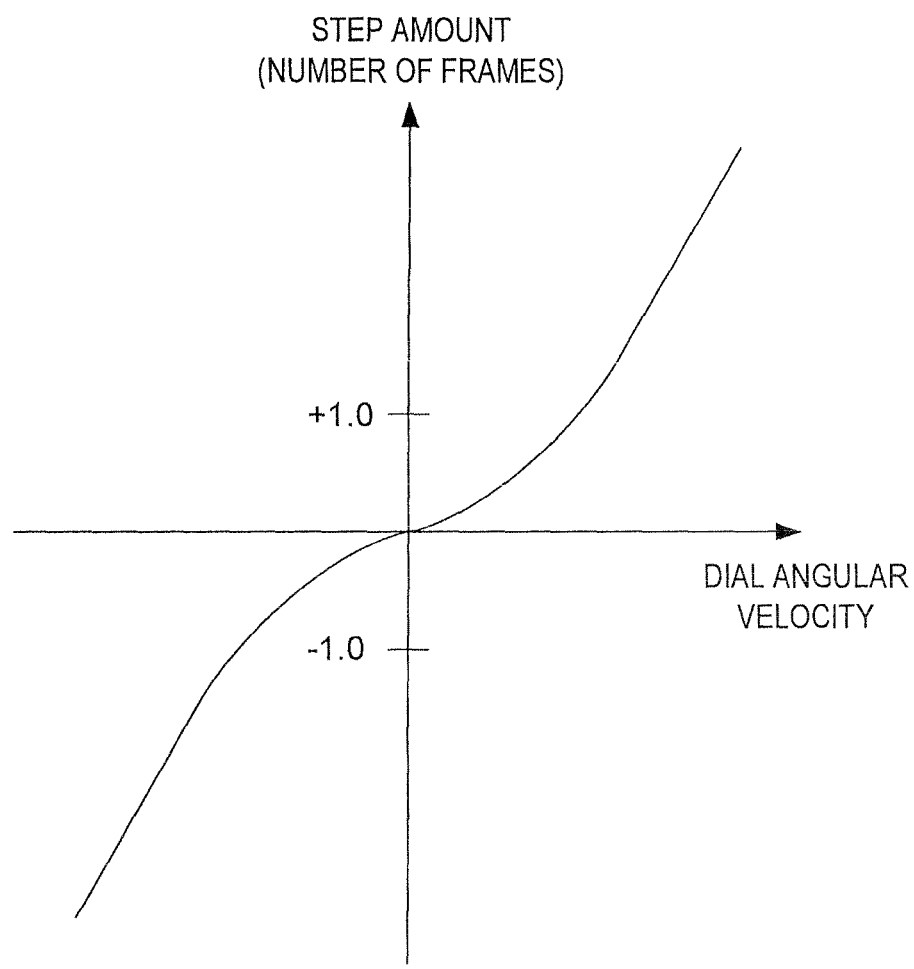
FIG. 13 is a diagram showing an example of the corresponding relation between an angular velocity and the step amount.

In the above embodiment, an example in which the step amount set by the step amount setting unit 152 being operated by the user is used is shown. However, deciding the step amount based on the angular velocity, which is the operation speed of the jog operation dial 151, and using the step amount can also be considered. The angular velocity is calculated from the amount of rotation of the jog operation dial 151 in a fixed period before a jog instruction arises. FIG. 13 shows an example of the corresponding relation between the angular velocity and the step amount.

Figure 14:
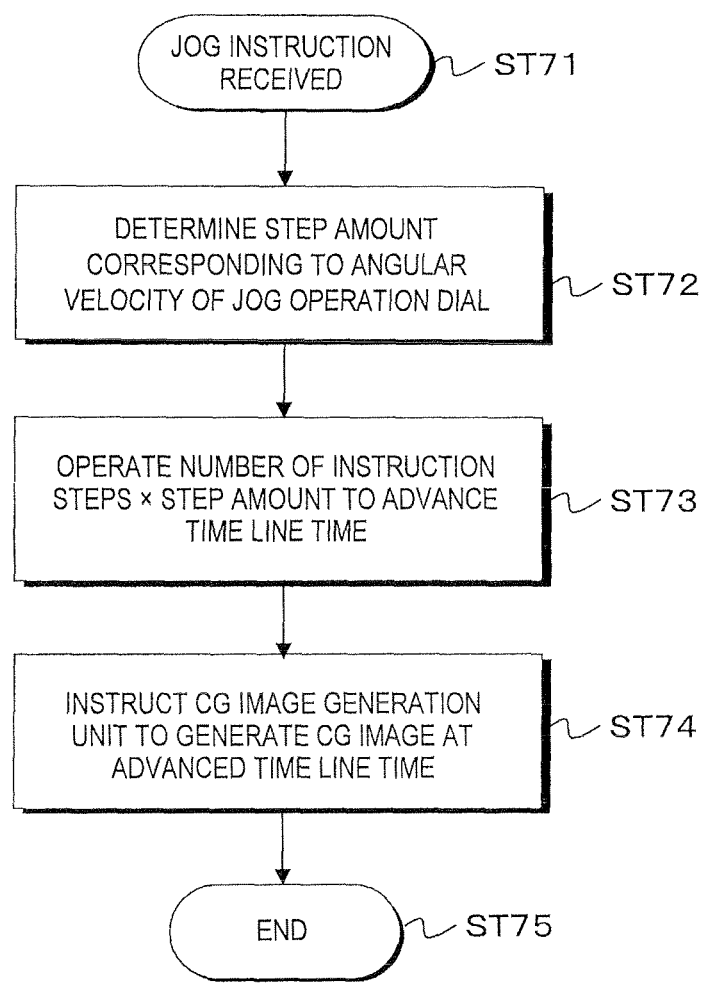
FIG. 14 is a flow chart showing an example of the control operation of the control unit during reception of a jog instruction when the step amount is decided based on the angular velocity and used.

The flow chart in FIG. 14 shows an example of the control operation of the control unit 140 when a jog instruction is received in that case. In step ST71, the control unit 140 receives a jog instruction to start the control operation.

Next, in step ST72, the control unit 140 determines the step amount of a real value corresponding to the angular velocity (operation speed) of the jog operation dial 151 based on a corresponding relation between the angular velocity and the step amount (see FIG. 13). Then, in step ST73, the control unit 140 determines the play amount by multiplying the number of instruction steps by the step amount and adds the play amount to the held time line time to advance the time line time. In this case, the sign of the play amount is positive if the rotation direction is clockwise and the sign of the play amount is negative if the rotation direction is counterclockwise.

Next, in step ST74, the control unit 140 instructs the CG image generation unit 130 to generate a CG image at the advanced time line time. In this case, if the time line time is not a key frame, the control unit 140 interpolates parameters of the time line time by using parameters of the previous and subsequent key frames on the time line to decide the control for the CG image generation unit 130. After the processing in step ST74, the control unit 140 terminates the control operation in step ST75.

Thus, if the step amount is decided based on the corresponding relation between the angular velocity (operation speed) of the jog operation dial 151 and the step amount, the user can save the time and effort to set the step amount and also can perform an appropriate jog operation with the step amount per instruction step suited to the operation speed of the jog operation dial 151 by the user.

[Addition of the Velocity Coefficient to CG Description Data]

Though not described, the velocity coefficient may be added to each piece of CG description data stored in the CG description data storage unit 120 as an attribute value. The velocity coefficient is used to control the speed of advance of the time line time for generating a CG image by the CG image generation unit 130. That is, the velocity coefficient is a value multiplied by the original CG description data for execution of animation.

The speed of advance of the time line time is set to be a multiple of the velocity coefficient of the normal speed of advance. Thus, if the length of the original time line of CG description data is T and the velocity coefficient is C, the actual length of the time line of CG image generation is T/C. More specifically, if, for example, the velocity coefficient 4 is attached to the CG animation produced with the length of 20 s, the actual length will be 5 s.

In this case, the animation is handled as being changed (derived) to such animation with the attachment of the velocity coefficient. When the CG description data is loaded into the CG image generation unit 130 for jog operation, the control unit 140 determines the play amount by multiplying the number of instruction steps by the jog operation dial 151 by the step amount and further by the velocity coefficient. If, for example, the step amount is 0.2 frames and the velocity coefficient is 4, the time line time is advanced only by 0.8 frames per instruction step.

By determining the step amount for a jog operation as described above based on the velocity coefficient, an intended jog operation can be performed on animation to which the velocity coefficient is attached. In the above example, the operation control of 5 s in which the start and the end are aligned in synchronization with other materials (such as VTR materials) can be exercised.

Figure 15:
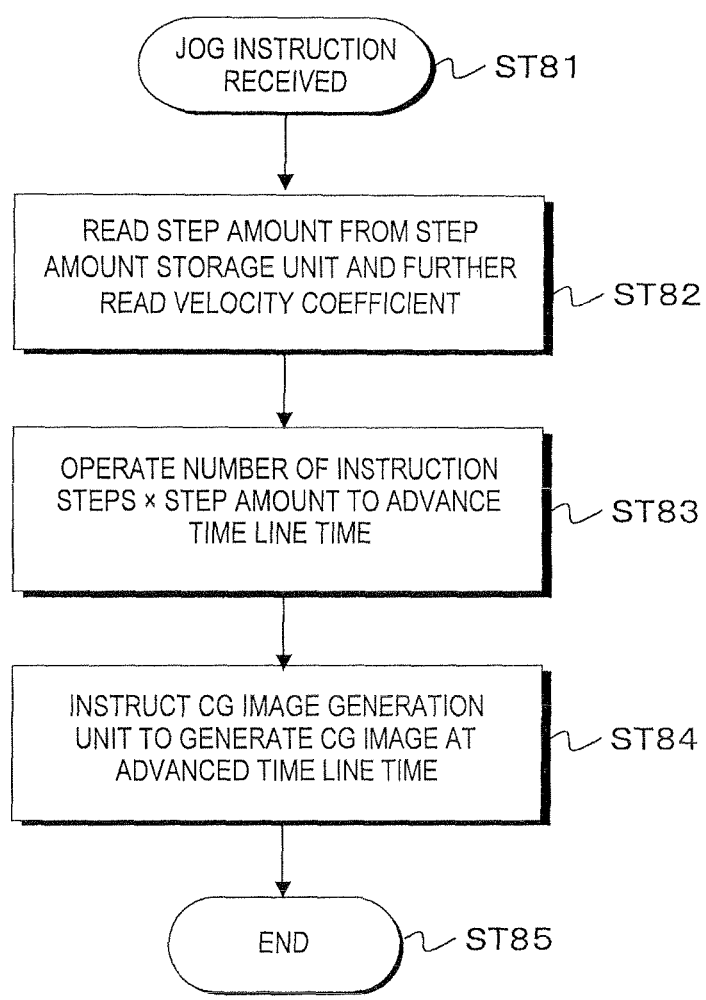
FIG. 15 is a flow chart showing an example of the control operation of the control unit during reception of a jog instruction when a velocity coefficient is attached to CG description data as an attribute value.

The flow chart in FIG. 15 shows an example of the control operation of the control unit 140 when a jog instruction is received in that case. In step ST81, the control unit 140 receives a jog instruction to start the control operation.

Next, in step ST82, the control unit 140 reads the step amount corresponding to the CG description data loaded from the step amount storage unit 170 into the CG image generation unit 130 and used and also reads the velocity coefficient attached to the CG description data from a storage unit (not shown) inside the control unit 140. The velocity coefficient is acquired by the control unit 140 when, for example, the CG description data is loaded into the CG image generation unit 130 and stored in the storage unit inside the control unit 140.

Next, in step ST83, the control unit 140 determines the play amount by multiplying the number of instruction steps by the step amount and further by the velocity coefficient and adds the play amount to the held time line time to advance the time line time. In this case, the sign of the play amount is positive if the rotation direction is clockwise and the sign of the play amount is negative if the rotation direction is counterclockwise.

Next, in step ST84, the control unit 140 instructs the CG image generation unit 130 to generate a CG image at the advanced time line time. In this case, if the time line time is not a key frame, the control unit 140 interpolates parameters of the time line time by using parameters of the previous and subsequent key frames on the time line to decide the control for the CG image generation unit 130. After the processing in step ST84, the control unit 140 terminates the control operation in step ST85.

<2. Second Embodiment>

Figure 16:
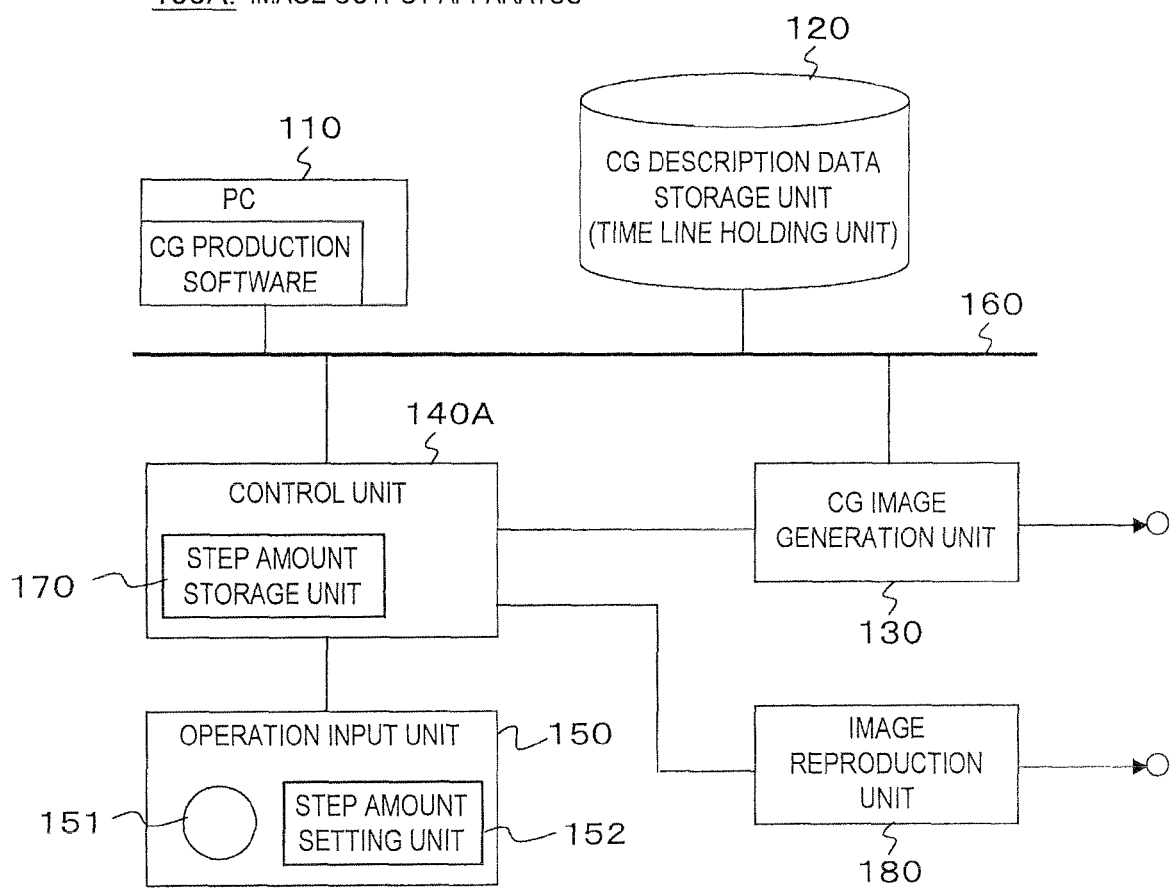
FIG. 16 is a block diagram showing a configuration example of an image output apparatus as a second embodiment of the present technology.

FIG. 16 shows a configuration example of an image output apparatus 100A as a second embodiment of the present technology. In FIG. 16, the same reference numerals are attached to portions corresponding to portions in FIG. 1 and a detailed description thereof is omitted when appropriate.

The image output apparatus 100A includes the CG (computer graphic) production unit 110, the CG description data storage unit 120, the CG image generation unit 130, a control unit 140A, the operation input unit 150, the network 160, and an image reproduction unit 180. The CG production unit 110, the CG description data storage unit 120, the CG image generation unit 130, and the control unit 140A are mutually connected by the network 160.

The image reproduction unit 180 is, for example, a VTR (Video Tape Recorder). While the CG image generation unit 130 constitutes a first image output unit capable of playing in a unit finer than the frame/field unit on the time axis, the image reproduction unit 180 constitutes a second image output unit that plays in the frame/field unit on the time axis.

The control unit 140A controls the operation of each unit of the image output apparatus 100A. The control unit 140A exercises play control of CG image generation by the CG image generation unit 130 and play control of image reproduction by the image reproduction unit 180 in accordance with operation input by the user through the operation input unit 150. The play control also includes a jog play based on the operation of the jog operation dial 151 by the user.

When the jog operation dial 151 is operated, the control unit 140A determines the play amount by multiplying the number of instruction steps by the step amount and adds the play amount to the held time line time to advance the time line time. In this case, the sign of the play amount is positive if the rotation direction is clockwise and the sign of the play amount is negative if the rotation direction is counterclockwise. The step amount is a real value and thus, the play amount is also a real value. That is, the play amount takes not only integer values, but also fractional values.

The control unit 140A controls the CG image generation unit 130 so that a CG image corresponding to the advanced time line time is generated. In this case, if the time line time is not a key frame, the control unit 140A interpolates parameters of the time line time by using parameters of the previous and subsequent key frames on the time line to decide the control for the CG image generation unit 130.

The control unit 140A rounds off the advanced time line time to the frame/field unit and controls the image reproduction unit 180 so that an image corresponding to the rounded value (time) is generated. Rounding off the advanced time line time to the frame/field unit means removing a unit portion smaller than the frame/field unit of the advanced time line time.

If, for example, the image reproduction unit 180 is a VTR, concrete communication content of instructions given to the VTR depends on the actual protocol (existing protocol) and thus, communication of content that achieves an objective by using the existing protocol is created. If, for example, the time line time is advanced by one field, a communication command is sent to advance the time line time by one field time (1/60 s). This can be realized by, for example, sending an instruction to play for one field and stop in the next field. The VTR control is originally servo control and is based on the speed control.

Figure 17:
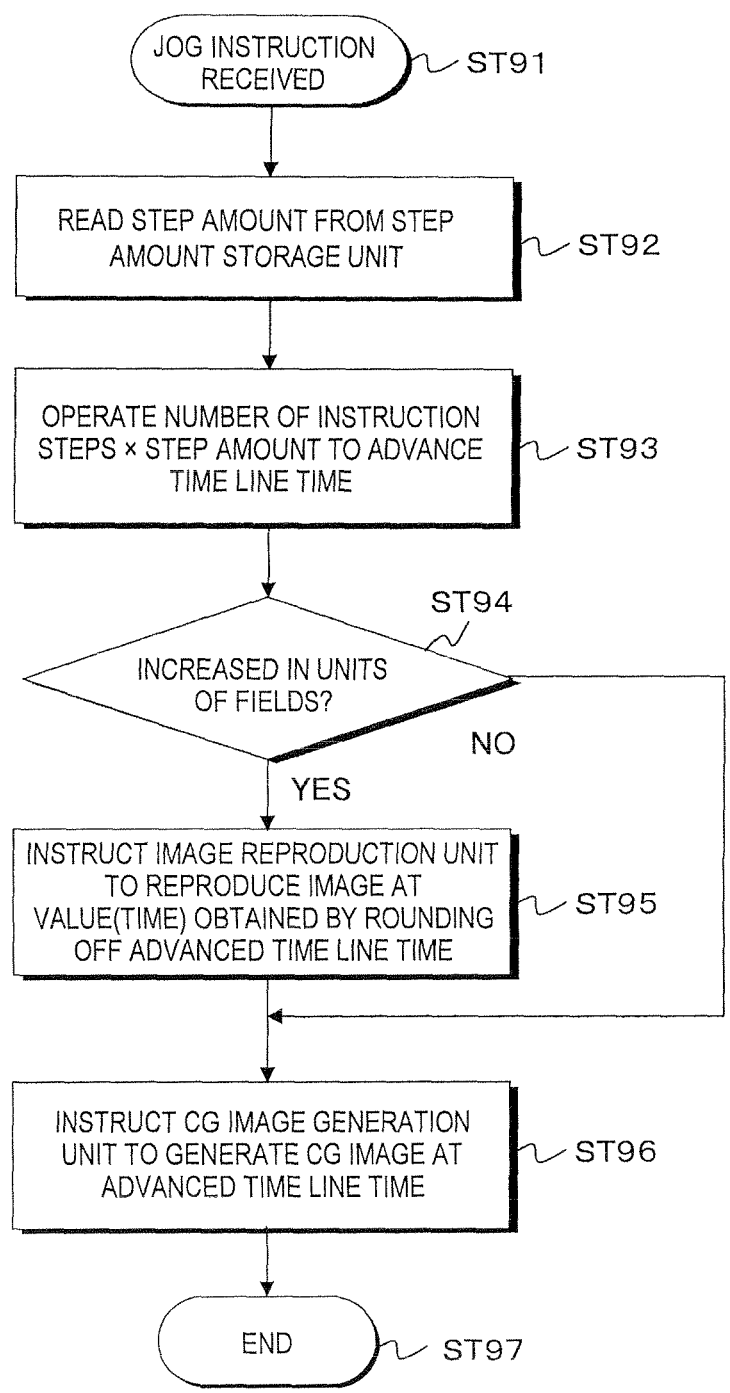
FIG. 17 is a flow chart showing an example of the control operation of the control unit during reception of a jog instruction.

The flow chart in FIG. 17 shows an example of the control operation of the control unit 140A when a jog instruction is received. This example shows an example in which the image reproduction unit 180 handles an interlaced material. When the image reproduction unit 180 handles a progressive material, "field unit" is replaced by "frame unit". In step ST91, the control unit 140A receives a jog instruction to start the control operation.

Next, in step ST92, the control unit 140A reads the step amount corresponding to the CG description data loaded from the step amount storage unit 170 into the CG image generation unit 130 and used. Then, in step ST93, the control unit 140A determines the play amount by multiplying the number of instruction steps by the step amount and adds the play amount to the held time line time to advance the time line time. In this case, the sign of the play amount is positive if the rotation direction is clockwise and the sign of the play amount is negative if the rotation direction is counterclockwise.

Next, in step ST94, the control unit 140A determines whether the time line time has increased in units of fields (decreased if the play amount is negative). If the time line time has increased in units of fields, the control unit 140A proceeds to processing in step ST95. In step ST95, the control unit 140A instructs the image reproduction unit 180 to reproduce an image at a value (time) obtained by rounding off the advanced time line time to the frame/field unit.

After the processing in step ST95, the control unit 140A proceeds to processing in step ST96. If, in step ST94, the time line time has not increased in units of fields, the control unit 140A immediately proceeds to the processing in step ST96. In step ST96, the control unit 140A instructs the CG image generation unit 130 to generate a CG image at the advanced time line time. In this case, if the time line time is not a key frame, the control unit 140A interpolates parameters of the time line time by using parameters of the previous and subsequent key frames on the time line to decide the control for the CG image generation unit 130. After the processing in step ST96, the control unit 140A terminates the control operation in step ST97.

FIG. 3D shows an example in which the step amount is set to ⅓ field. In this case, as indicated by "black inverted delta" symbols, the time line time is advanced in increments of ⅙ frame (⅓ field) with respect to one instruction step of the jog operation dial 151 and the CG image generation unit 130 is instructed to generate an image at the advanced time line time. Also in this case, as indicated by "white inverted delta" symbols, the image reproduction unit 180 is instructed to reproduce an image at a value (time) obtained by rounding off the advanced time line time to the field unit once in three instruction steps.

[Fraction Process when Stopped]

The jog operation is originally intermittent and the stop and play are frequently repeated. In such a case, the above processing may continue every one-frame time or one-field time. That is, a real-value time line time may be used uninterruptedly. However, if a normal play is instructed after a jog operation, the control unit 140A performs special processing.

If, for example, the time line time is a non-integer value when a normal play, that is, the play of speed 1 is started after a play command being received, a non-integer value state will continue even if an integer is added. This will keep frames output by the image reproduction unit 180, for example, a VTR and frames output by the CG image generation unit 130 and corresponding to a non-integer time line time shifted for a fraction of the non-integer.

Thus, if a normal play is started by receiving a play command after a jog operation being stopped, the control unit 140A makes adjustments to remove a unit portion finer than the frame/field unit from the held time line time. Then, the control unit 140A instructs the CG image generation unit 130 to generate or reproduce an image at the adjusted time.

Figure 18:
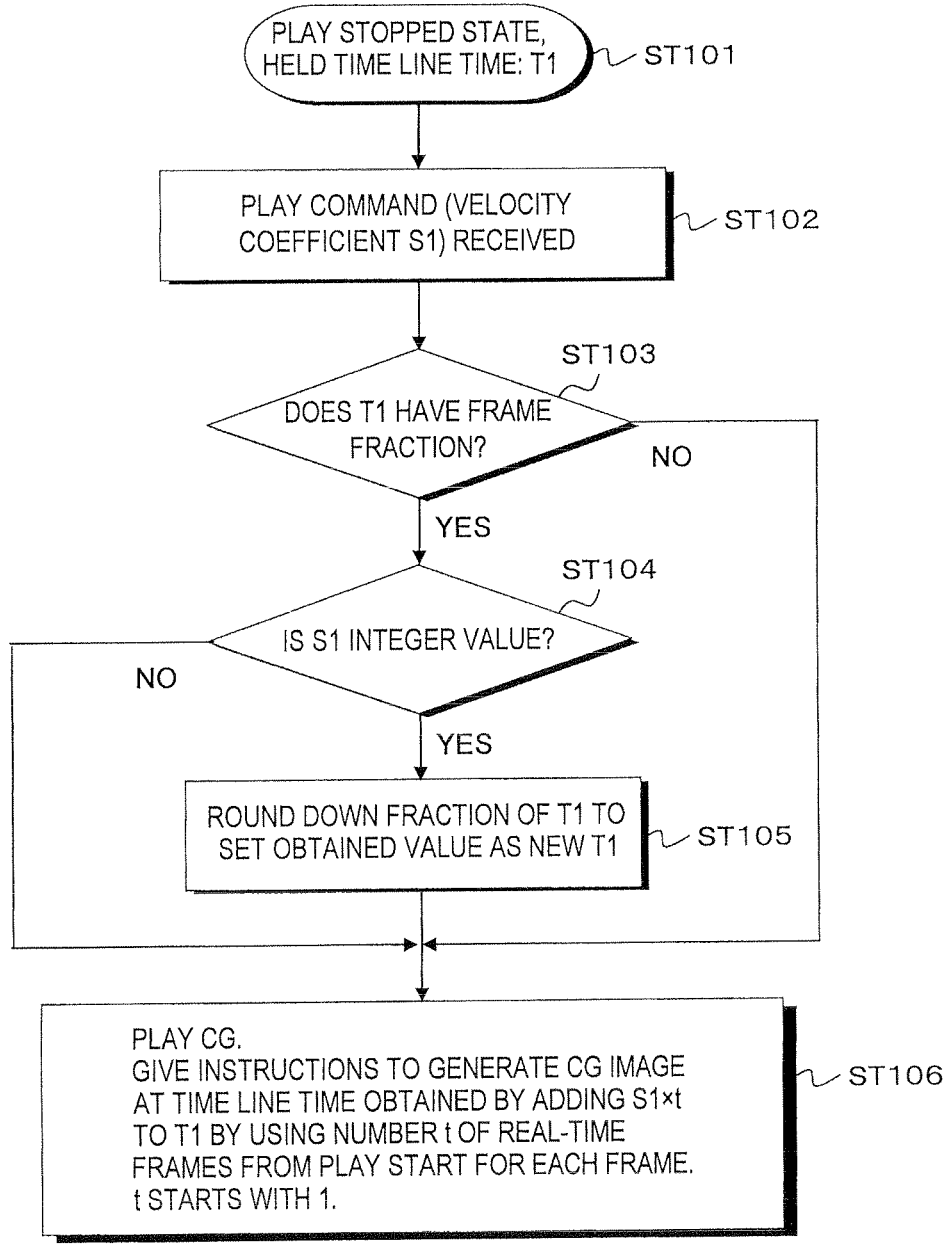
FIG. 18 is a flow chart showing an example of the control operation of the control unit when a normal play is instructed after the jog operation.

The flow chart in FIG. 18 shows an example of the control operation of the control unit 140A when a normal play is instructed after the jog operation. In step ST101, the control unit 140A starts the control operation. The time line time (time on the time axis) at this point is assumed to be T1.

Next, in step ST102, the control unit 140A receives a play command from the operation input unit 150. The velocity coefficient in this case is assumed to be S1. Then, in step ST103, the control unit 140A determines whether the time line time T1 contains, for example, a unit portion finer than the frame unit, that is, a frame fraction.

If there is no frame fraction, the control unit 140A immediately proceeds to processing in step ST106. On the other hand, if there is a frame fraction, the control unit 140A immediately proceeds to processing in step ST104. In step ST104, the control unit 140A determines whether the velocity coefficient S1 is an integer value. If the velocity coefficient S1 is not an integer value, the control unit 140A immediately proceeds to the processing in step ST106.

If the velocity coefficient S1 is an integer value, the control unit 140A rounds down a frame fraction of the time line time T1 to set the new time line time T1. After processing in step ST105, the control unit 140A proceeds to processing in step ST106.

In step ST106, the control unit 140A causes the CG image generation unit 130 to proceed with generation of a CG image. In this case, the control unit 140A instructs the CG image generation unit 130 to generate a CG image at the time line time obtained by determining S1×t by using the number t of real-time frames from the play start and adding S1×t to T1 for each frame. t starts with 1. By determining S1×t and adding S1×t to T1 for each frame, calculation errors can be preventing from accumulating due to iteration of addition.

In the flow chart in FIG. 18, it is assumed that, for example, the initially held time line time (time code) is "01:00:00:05.75" and the velocity coefficient S1 is an integer value. In such a case, the time line time T1 is determined to have a frame fraction in step ST103 and the velocity coefficient S1 is determined to be an integer value in step ST104.

Thus, the frame fraction is rounded down in step ST105 and the new time line time (time code) becomes "01:00:00:05.00". Therefore, in step ST106, the time line time (time code) advances like "01:00:00:05"->"01:00:00:07"->"01:00:00:11"-> . . . and the CG image generation unit 130 is instructed to generate CG images accordingly.

In the flow chart in FIG. 18, the processing in step ST103 is actually unnecessary. That is, if the time line time (time code) T1 is an integer, nothing changes in rounding down of a frame fraction in step ST105.

<3. Modification>

In the above embodiments, a case when an image output unit capable of playing in a unit finer than the frame/field unit on a time axis is the CG image generation unit 130 is shown. However, if an image reproduction apparatus such as a VTR and disk player can receive instructions in a unit finer than the frame/field unit, such an image reproduction apparatus may become a target to which instructions containing fractions are sent. If video frames can be output in a unit finer than the field unit by interpolation technology, output in accordance with an operation can be obtained.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image output apparatus, including:

an image output unit capable of playing in a unit finer than a frame/field unit on a time axis; and a control unit that determines a play amount by performing a predetermined operation on an operation input amount, advances a time indicating a position on the time axis in accordance with the determined play amount, and instructs the image output unit to output an image at the advanced time.

(2) The image output apparatus according to (1), wherein the image output unit generates a computer graphics image based on computer graphics description data containing a time line operation, and wherein the control unit determines the play amount by performing the predetermined operation on the operation input amount, determines a time line time indicating a position on the time line in accordance with the determined play amount, and instructs the image output unit to generate the computer graphics image at the advanced time line time.

(3) The image output apparatus according to (1) or (2), wherein the operation input amount is the number of instruction steps using a jog operation dial, and wherein the control unit determines the play amount by multiplying the number of instruction steps by a step amount, which is the number of frames/fields as a real value for one instruction step.

(4) The image output apparatus according to (3), further including:

a step amount setting unit that sets the step amount.

(5) The image output apparatus according to (3) or (4), further including:

a step amount decision unit that decides the step amount based on the time line.

(6) The image output apparatus according to (5), wherein the step amount decision unit decides the step amount based on a ratio of a length of the time line to a reference length.

(7) The image output apparatus according to (5), wherein the step amount decision unit decides the step amount based on a length between key frames which are adjacent to each other on the time line.

(8) The image output apparatus according to (7), wherein the step amount decision unit decides the step amount on the whole time line based on a shortest length between key frames of lengths between key frames of a plurality of pairs of key frames contained on the time line.

(9) The image output apparatus according to (7), wherein the step amount decision unit decides the step amount based on the length between key frames for each pair of key frames.

(10) The image output apparatus according to (3) or (4), further including:

a step amount decision unit that decides the step amount for each time line time based on corresponding relation information between the time line time and the step amount.

(11) The image output apparatus according to (3) or (4), further including:

a step amount decision unit that decides the step amount based on an angular velocity of the jog operation dial.

(12) The image output apparatus according to any one of (3) to (11), further including:

a computer graphics description data holding unit that holds a plurality of pieces of the computer graphics description data; and a step amount storage unit that stores the step amount corresponding to each of the plurality of pieces of computer graphics description data, wherein the image output unit generates the computer graphics image by using one piece of the computer graphics description data selected from the plurality of pieces of computer graphics description data, and wherein the control unit determines the play amount by using the step amount corresponding to the computer graphics description data used by the image output unit.

(13) The image output apparatus according to any one of (3) to (12), wherein a velocity coefficient is attached to the computer graphics description data, and wherein the control unit determines the play amount by multiplying the number of instruction steps by the step amount and further by the velocity coefficient.

(14) A method of controlling an image output apparatus including an image output unit capable of playing in a unit finer than a frame/field unit on a time axis, the method including:

determining a play amount by performing a predetermined operation on an operation input amount, advancing a time indicating a position on the time axis in accordance with the determined play amount, and instructing the image output unit to output an image at the advanced time.

(15) A program for causing a computer to function as:

an image output unit capable of playing in a unit finer than a frame/field unit on a time axis; and a control unit that determines a play amount by performing a predetermined operation on an operation input amount, advances a time indicating a position on the time axis in accordance with the determined play amount, and instructs the image output unit to output an image at the advanced time.

(16) An image output apparatus, including:

a first image output unit capable of playing in a unit finer than a frame/field unit on a time axis;

a second image output unit that plays in units of frames/fields on the time axis; and a control unit that determines a play amount by performing a predetermined operation on an operation input amount, advances a time indicating a position on the time axis in accordance with the determined play amount, instructs the first image output unit to output an image at the advanced time, and instructs the second image output unit to output an image at a value obtained by rounding off the advanced time to a frame/field unit.

(17) The image output apparatus according to (16), wherein the control unit makes adjustments to remove a unit portion finer than the frame/field unit from a held time on the time axis when a play command is received after the first image output unit is stopped playing based on the operation input amount and then instructs the first image output unit to output an image from the adjusted time.

The present disclosure contains subject matter related to that disclosed in Japanese Priority Patent Application JP 2011-189041 filed in the Japan Patent Office on Aug. 31, 2011, the entire content of which is hereby incorporated by reference.

What is claimed is:

1. An image output apparatus, comprising:
an image output unit capable of playing in a unit finer than a single frame/field unit on a time axis; and
a control unit that determines a play amount, including the unit finer than the single frame/field unit, by performing a predetermined operation on an operation input amount, advances a time indicating a position on the time axis in accordance with the determined play amount, and instructs the image output unit to output an image at the advanced time.

2. The image output apparatus according to claim 1,
wherein the image output unit generates a computer graphics image based on computer graphics description data containing a time line operation, and
wherein the control unit determines the play amount by performing the predetermined operation on the operation input amount, determines a time line time indicating a position on the time line in accordance with the determined play amount, and instructs the image output unit to generate the computer graphics image at the advanced time line time.

3. The image output apparatus according to claim 2,
wherein the operation input amount is the number of instruction steps using a jog operation dial, and
wherein the control unit determines the play amount by multiplying the number of instruction steps by a step amount, which is the number of frames/fields as a real value for one instruction step.

4. The image output apparatus according to claim 3, further comprising:
a step amount setting unit that sets the step amount.

5. The image output apparatus according to claim 3, further comprising:
a step amount decision unit that decides the step amount based on the time line.

6. The image output apparatus according to claim 5,
wherein the step amount decision unit decides the step amount based on a ratio of a length of the time line to a reference length.

7. The image output apparatus according to claim 5,
wherein the step amount decision unit decides the step amount based on a length between key frames which are adjacent to each other on the time line.

8. The image output apparatus according to claim 7,
wherein the step amount decision unit decides the step amount on the whole time line based on a shortest length between key frames of lengths between key frames of a plurality of pairs of key frames contained on the time line.

9. The image output apparatus according to claim 7,
wherein the step amount decision unit decides the step amount based on the length between key frames for each pair of key frames.

10. The image output apparatus according to claim 3, further comprising:
a step amount decision unit that decides the step amount for each time line time based on corresponding relation information between the time line time and a stored step amount.

11. The image output apparatus according to claim 3, further comprising:
a step amount decision unit that decides the step amount based on an angular velocity of the jog operation dial.

12. The image output apparatus according to claim 3, further comprising:
a computer graphics description data holding unit that holds a plurality of pieces of the computer graphics description data; and
a step amount storage unit that stores the step amount corresponding to each of the plurality of pieces of computer graphics description data,
wherein the image output unit generates the computer graphics image by using one piece of the computer graphics description data selected from the plurality of pieces of computer graphics description data, and
wherein the control unit determines the play amount by using the step amount corresponding to the computer graphics description data used by the image output unit.

13. The image output apparatus according to claim 3,
wherein a velocity coefficient is attached to the computer graphics description data, and wherein the control unit determines the play amount by multiplying the number of instruction steps by the step amount and further by the velocity coefficient.

14. A method of controlling an image output apparatus including an image output unit capable of playing in a unit finer than a single frame/field unit on a time axis, the method comprising:

determining a play amount, including the unit finer than the single frame/field unit, by performing a predetermined operation on an operation input amount, advancing a time indicating a position on the time axis in accordance with the determined play amount, and instructing the image output unit to output an image at the advanced time.

15. A program embodied on a non-transitory computer readable medium for causing a computer to function as:

an image output unit capable of playing in a unit finer than a single frame/field unit on a time axis; and a control unit that determines a play amount, including the unit finer than the single frame/field unit, by performing a predetermined operation on an operation input amount, advances a time indicating a position on the time axis in accordance with the determined play amount, and instructs the image output unit to output an image at the advanced time.

16. An image output apparatus, comprising:

a first image output unit capable of playing in a unit finer than a single frame/field unit on a time axis;

a second image output unit that plays in units of frames/fields on the time axis; and a control unit that determines a play amount, including the unit finer than the single frame/field unit, by performing a predetermined operation on an operation input amount, advances a time indicating a position on the time axis in accordance with the determined play amount, instructs the first image output unit to output an image at the advanced time, and instructs the second image output unit to output an image at a value obtained by rounding off the advanced time to a frame/field unit.

17. The image output apparatus according to claim 16, wherein the control unit makes adjustments to remove a unit portion finer than the frame/field unit from a held time on the time axis when a play command is received after the first image output unit is stopped playing based on the operation input amount and then instructs the first image output unit to output an image from the adjusted time.

* * * * *